UNITED STATES PATENT OFFICE.

WILLIAM CLOUGH, OF CINCINNATI, OHIO.

IMPROVEMENT IN DEFECATING SACCHARINE FLUIDS.

Specification forming part of Letters Patent No. 87,758, dated March 16, 1869; antedated February 27, 1869.

*To all whom it may concern:*

Be it known that I, WILLIAM CLOUGH, of Cincinnati, in the county of Hamilton and State of Ohio, have discovered a new and useful Improvement in Defecating Saccharine Fluids; and I do hereby declare the following to be a full, clear, and exact description of the same.

In the manufacture of sirup and sugar from cane and beet juice it is common to treat the juice with a portion of lime and heat it nearly to the boiling-point. The coagulated impurities are by these means brought to the surface, and are from thence removed by skimming, or the defecated juice is drawn off from below. In some cases the juice is boiled actively and the scum removed from the surface of the boiling fluid.

In refining crude sirups and sugars solutions of proper density are usually treated with lime or other alkaline agent and then heated or blown up with injected steam, and the coagulated impurities which appear upon the surface removed, after which the solution is further cleansed by filtering. When the solution to be defecated does not afford in itself coagulable matter sufficient to lock up and inclose suspended impurities and produce a good defecation, it is common to add serum of blood or other albuminous substance to assist defecation.

My improvement consists in employing, in combination with the foregoing common processes of defecating, a finely-ground, heavy, insoluble powder, added to the juice or dilute sirup before coagulation is produced. Particles of this powder being inclosed or locked up in the flakes of coagulated matter impart gravity to them, and cause them to settle to the bottom in the form of a dense, compact sediment, from which the clear liquid can be withdrawn, and by which the operation of defecation can be conducted with less careful attention, less labor, and better results. Finely-divided or ground sulphate of baryta affords an appropriate powder for the purpose. Other substances may be used, and in weak solutions—such as unconcentrated cane or beet juice—a powder of less gravity than the above will answer very well. The powder should be very fine, and of a substance that will impart no offensive or injurious property to the solution. It is better to add the powder to the solution while in a cold state and before adding the lime, albumen, or other defecating agent. One ounce of the powder to a gallon of the solution will be found an appropriate quantity. After the coagulation has been completed by boiling, the solution should be run into tanks or convenient vessels, where it can remain quiet for twenty or thirty minutes. The clear liquid may then be decanted from the sediment, and the latter may be washed or put into bags and the saccharine matter which it contains recovered by pressing in an ordinary scum-press.

I am aware that cane-juice and other saccharine solutions, after being treated in the ordinary way with lime and other defecating agents and heated to effect defecation, and usually after the removal of all the impurities which appear upon the surface, have been run off into tanks and allowed to remain at rest for a while to permit the remaining suspended impurities to subside; but in such cases the floating particles of matter, being not much heavier than the fluid in which they are suspended, do not all subside, and the portion which reaches the bottom forms a light, bulky sediment, from which it is difficult to draw off or separate the liquid.

I am also aware that in the process of deodorizing and refining saccharine and other fluids for which Letters Patent were granted to me March 10, 1868, a heavy powder is used for the purpose of imparting gravity to the precipitate formed by the silicate which is provided to be used in the process; but I am not aware that in the ordinary modes of defecating cane-juice or other saccharine solutions a heavy powder has been used for the purpose herein specified, and I believe its use as herein explained to be a new and valuable improvement.

I claim—

The improvement in the process of defecating saccharine fluids herein described.

WM. CLOUGH.

Witnesses:
W. G. STONE,
W. V. CLOUGH,